(12) United States Patent
Schillinger et al.

(10) Patent No.: US 7,481,105 B2
(45) Date of Patent: Jan. 27, 2009

(54) TANK SYSTEM WITH FUEL LEVEL GAUGE

(75) Inventors: Alexander Schillinger, Grafing (DE); Guenther Heindel, Munich (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 364 days.

(21) Appl. No.: 11/369,696

(22) Filed: Mar. 7, 2006

(65) Prior Publication Data

US 2006/0201578 A1 Sep. 14, 2006

(30) Foreign Application Priority Data

Mar. 8, 2005 (DE) .................. 10 2005 011 049

(51) Int. Cl.
*G01F 23/296* (2006.01)
(52) U.S. Cl. ............... 73/290 V; 73/290 B; 73/290 R; 73/298
(58) Field of Classification Search .......... 73/290 V, 73/290 B, 290 R, 296, 298
See application file for complete search history.

(56) References Cited

U.S. PATENT DOCUMENTS

| | | | | |
|---|---|---|---|---|
| 4,361,038 A | * | 11/1982 | Schuler | 73/295 |
| 5,315,873 A | * | 5/1994 | Jin | 73/309 |
| 5,410,518 A | * | 4/1995 | Birkett | 367/87 |
| 5,456,108 A | | 10/1995 | Birkett | |
| 5,617,757 A | * | 4/1997 | Horner | 73/290 V |
| 5,856,953 A | * | 1/1999 | Durkee | 367/99 |
| 6,907,780 B1 | * | 6/2005 | Meagher | 73/299 |
| 6,968,738 B2 | * | 11/2005 | Atkinson | 73/290 V |
| 7,421,895 B1 | * | 9/2008 | Caldwell | 73/290 V |
| 2003/0061876 A1 | * | 4/2003 | Atkinson | 73/290 V |

FOREIGN PATENT DOCUMENTS

DE 69422002 T 7/2000
DE 20310723 11/2004

OTHER PUBLICATIONS

German Patent Application Office Action for Application Serial No. DE 10 2005 011 049.5-52, dated Feb. 10, 2006 (4 pages) and translation of relevant parts thereof (3 pages).

* cited by examiner

*Primary Examiner*—David A. Rogers
(74) *Attorney, Agent, or Firm*—Darby & Darby

(57) ABSTRACT

A fuel level gauge includes a measuring pipe configured as a riser pipe that has a fuel inlet opening at one end region defines a measuring distance. The fuel level gauge also includes a fuel level sensor associated with the measuring pipe and disposed the vicinity of the fuel inlet opening and having a measurement-sensitive sensor area for purposes of measuring the fuel filling height in the measuring pipe. A fuel-permeable, thin-walled enveloping element surrounding the measuring pipe tightly so as to seal it in a first area of the measuring pipe and enclosing a second area of the measuring pipe at a predefined distance over a large surface. The second area encompasses at least the fuel inlet opening and the measurement-sensitive area of the fuel level sensor, and forms a large-volume antechamber upstream from the fuel inlet opening in the second area between an inside of the enveloping element and an outside of the measuring pipe.

20 Claims, 6 Drawing Sheets

TANK SYSTEM WITH FUEL LEVEL GAUGE

Priority is claimed to German Patent Application No. DE 10 2005 011 049.5, filed on Mar. 8, 2005, the entire disclosure of which is incorporated by reference herein.

The present invention relates to a fuel level gauge, to a tank system having such a fuel level gauge as well as to an aircraft, especially to a rotary-wing aircraft such as, for example, a helicopter, having such a tank system.

BACKGROUND

Fuel level gauges are used to determine the filling height in a fuel tank and from that, in turn, the filling volume of the tank. Such devices are known in a variety of configurations. Fuel level gauges, for instance, for vehicles, are relatively simple in design and have fuel level sensors, for example, in the form of simple float constructions or the like. However, fuel level gauges for applications in aviation are quite complex in design.

This is due to the fact that, among other things, it has to be possible to refuel aircraft—as a function of the type of aircraft and of the scope of its mission—under all kinds of different conditions, a process in which high requirements are made of the precision of the fuel level gauges. Hence, it has to be possible to carry out refueling on the ground, air-to-air refueling (so-called in-flight refueling by means of a tanker aircraft) or, in the case of a rotary-wing aircraft, even so-called hover-in-flight refueling. Hover-in-flight refueling can be done, for example, from a ship above which the rotary-wing aircraft is hovering. Refueling on the ground makes use of so-called gravity refueling, in which the fuel is pumped into the tank through the effect of gravity or at a very low pressure, and also makes use of so-called high-pressure refueling (referred to below in short as pressure refueling), in which the fuel is filled into the tank by means of a pressure refueling device at a pressure of approximately 2 to 10 bar. In-flight refueling and hover-in-flight refueling fundamentally call for the latter modality of refueling, that is to say, high-pressure refueling. The (pressure) refueling of an aircraft is a safety-critical procedure. For this reason, the refueling operation has to be continuously checked. Here, in particular, the current filling level, the filling volume and the filling weight of the tank have to be constantly monitored. This serves for controlling or regulating and monitoring the refueling operation itself as well as for determining and checking important flight-mechanical parameters such as, for example, the fuel weight resulting from the filled fuel volume and, in turn, the maximum permissible take-off weight and flying weight as well as the maximum attainable range and flying time of the aircraft in question. To this end, the (pressure) refueling device and the fuel level gauge can normally be coupled to a fuel management system that, especially on the basis of the measured data acquired by the fuel level gauge, performs the necessary calculations and, if applicable, forwards this data to an on-board computer of the aircraft or to additional control devices.

A prior-art fuel level gauge of an aircraft has a measuring pipe configured as a riser pipe that has a fuel inlet opening at one end and that defines a measuring distance, and it also has a fuel level sensor associated with the measuring pipe in order to measure the fuel filling height in the measuring pipe. Normally speaking, a capacitive sensor is used as the fuel level sensor. This sensor functions according to the following principle: depending on the filling height of the fuel in the measuring pipe and the related degree of wetting of the measuring pipe surface with the fuel, a change occurs in the capacitance that—as a measurable quantity—represents a measure of the fuel filling height in the tank.

SUMMARY OF THE INVENTION

It has been found that, with a number of conventional fuel level gauges intended for aircraft, quite severe malfunctions occur, especially during pressure refueling, which manifest themselves in impermissible measured signals and in a measured curve that is useless when considered over the course of the refueling time. Such a flawed measured curve is shown schematically in FIG. 6. It is characterized especially by an irregular, unsteady curve shape with numerous signal peaks as well as by a signal delay. The lack of reliability of the measured signal or the uselessness of the measured curve means that the fuel management system cannot reliably evaluate the measured data of the fuel level gauge during the refueling, the pressure refueling device cannot be reliably controlled and the above-mentioned mission-relevant flight-mechanical parameters cannot be precisely determined.

An object of the present invention is to provide an improved fuel level gauge that yields reliable filling level measured signals that can be evaluated, even under pressure refueling conditions. A further or alternate object of the present invention is to provides a tank system suitable for pressure refueling and having such a fuel level gauge, as well as an aircraft having such a tank system.

The present invention provides a fuel level gauge including:

a measuring pipe configured as a riser pipe that has a fuel inlet opening at one end area and that defines a measuring distance;

a fuel level sensor that is associated with the measuring pipe, that is arranged in the vicinity of the fuel inlet opening and that is provided with a measurement-sensitive sensor area, for purposes of measuring the fuel filling height in the measuring pipe;

and a fuel-permeable, thin-walled enveloping element which—starting from a first area (preferably from an outer circumferential area) of the measuring pipe where it surrounds the measuring pipe tightly so as to seal it—encloses a second area (preferably likewise an outer circumferential area) of the measuring pipe at a predefined distance over a large surface, said second area encompassing at least the fuel inlet opening and the measurement-sensitive area of the fuel level sensor, and forming a large-volume antechamber that is upstream from the fuel inlet opening in this second area between the inside of said enveloping element and the outside of the measuring pipe.

The measuring pipe can fundamentally have one or more internal spaces or can consist of several individual hollow elements or tube-like structures that preferably communicate with each other.

The fuel-permeable, thin-walled enveloping element can be configured as a single-layered or multi-layered structure (e.g. also with interstices) or can have single-layered or multi-layered areas. Moreover, the enveloping element can be configured so as to be either inherently stable or dimensionally stable, or else it can require a special support structure so that it does not collapse. In the latter case, it is possible to mount the enveloping element, for example, in a separate support structure or to configure the enveloping element integrally with the support structure.

The term "surrounding so as to seal" means that no fuel can penetrate between the enveloping element and the first area or outer circumferential area of the measuring pipe. Therefore, the fuel—or at least most of the fuel that is to be fed to the measuring pipe inevitably has to pass through the enveloping element in order to reach the measuring pipe. The term large-surface envelope as employed in the invention refers to an envelope that is many times larger than the free surface area of the fuel inlet opening or of a fuel labyrinth located upstream from this opening. Thus, the surface of the enveloping element is preferably at least 100 to 10,000 times larger than the free surface area of the fuel inlet opening, especially 500 to 5000 times, 600 to 4000 times, 800 to 3000 times, 1000 to 2500 times, 1200 to 2000 times, 1300 to 1800 times, 1400 to 1500 times larger. However, the invention is not restricted to these size ratios. Depending on the application case, the enveloping element can have an even larger surface area. The surface of the envelope of the enveloping element can be either essentially smooth or else it can be enlarged by a plurality of folds, waves, indentations and/or bulges and the like.

The term large-volume antechamber refers to an antechamber whose volume is at least half the size of the inner volume of the measuring pipe, but preferably it is much larger than that. Thus, if possible, the volume of the antechamber should be 2 to 200 times, 5 to 1000 times, 5 to 500 times, 10 to 250 times, 20 to 100 times larger than the inner volume of the measuring pipe. However, the invention is not restricted to these volume ratios. Depending on the application case, the volume of the antechamber can also be much larger.

The fuel level gauge according to the invention yields reliable measured signals with flawless signal characteristics, even under pressure refueling conditions. Hence, a regular, steady measured curve can be obtained over the entire course of the refueling. Due to this high reliability of the measured signal and the especially favorable measured curve, the measured data provided by the fuel level gauge can also be continuously evaluated by a fuel management system during the (pressure) refueling operation. Furthermore, the fuel management system can dependably, reliably and very precisely ascertain the parameters that are dependent on the filling level data such as, for example, the exact filling volume and the filling weight of the fuel tank, and if applicable, the fuel management system can forward this data to add-on devices such as, for example, an on-board computer which, based on this data, in turn, determines important flight-mechanical, mission-relevant parameters such as, for instance, the maximum permissible take-off weight and flying weight as well as the maximum attainable range and flying time.

The inventors have realized that, during pressure refueling operations, detrimental effects occur in the area of the measuring pipe that defines the measuring distance that is decisive for measuring the level of fuel in a tank. These detrimental effects are manifested especially in the form of strong fuel turbulences, severe bubble and foam formation (surface foam and/or so-called emulsion foam) in the fuel that is flowing at a high pressure into the tank and into the measuring pipe, as well as in the form of fast, pronounced and irregular fluctuations in the fuel level in the measuring pipe, for instance, due to sloshing or splashing of the fuel that has been filled into the tank. This results in measuring errors by the fuel level sensor and in the above-mentioned unfavorable signal characteristics.

The use of the fuel-permeable, thin-walled enveloping element with its special arrangement however, makes it possible to effectively avoid the disadvantageous effects these detrimental effects have on the measuring procedure. After all, before the fuel can reach the measuring pipe, it first has to flow through the large-surface enveloping element. This largely suppresses bubble and foam formation in the fuel. The fuel permeability and the length of the penetration segment that is defined especially by the thickness of the enveloping element should be selected here in such a way that the entry of the fuel into the antechamber and the flow of the fuel from there into the measuring pipe are not excessively delayed or are not delayed at all since this, in turn, could cause a detrimental measuring delay or a measuring error. Moreover, the enveloping element acts as a kind of damping element for the sloshing fuel that is highly turbulent and that is flowing into the tank at a high pressure, so that the fuel is already stabilized when it flows into the antechamber. In this manner, strong fluctuations of the fuel level, which is continually changing during the refueling operation, are avoided in the antechamber and in the downstream measuring pipe. The antechamber itself also acts as a kind of damping chamber from which the further stabilized fuel then flows uniformly via the fuel inlet opening into the measuring pipe and gradually fills it steadily and without strong turbulences or level fluctuations, as the refueling operation progresses.

As a result, the measurement-sensitive sensor area of the fuel level sensor is always operating in an optimal measuring environment. In this manner, during the entire (pressure) refueling operation, the fuel level in a tank as the refueling operation progresses and the resultant fuel volume and the fuel weight in the tank can all be reliably determined. The fuel level gauge according to the invention can fundamentally be configured without mechanically moving parts, which ensures a high reliability and fault tolerance. Moreover, conventional fuel level gauges can easily be retrofitted so as to have the configuration according to the invention. The additional weight created by the enveloping element and its fastening elements is negligibly small, which is particularly advantageous for light-weight aviation applications. In summary, the fuel level gauge according to the invention is a technically effective as well as very economical and cost-effective solution.

According to a second aspect, the present invention provides a fuel level gauge including:
  a measuring pipe configured as a riser pipe that has a fuel inlet opening at one end area and that defines a measuring distance;
  a fuel level sensor that is associated with the measuring pipe, that is arranged in the vicinity of the fuel inlet opening and that is provided with a measurement-sensitive sensor area, for purposes of measuring the fuel filling height in the measuring pipe;
  a (rigid or flexible) housing that is fitted with a fuel inlet channel and that surrounds a first area of the measuring pipe so as to seal it and that encloses a second area of the measuring pipe at a predefined distance over a large surface, said second area encompassing at least the fuel inlet opening and the measurement-sensitive area of the fuel level sensor, and forming a large-volume antechamber upstream from the fuel inlet opening in this second area between the inside of said housing and the measuring pipe, and
  a balloon-like or bubble-like, large-surface, fuel-permeable, thin-walled enveloping element that is provided with an opening and that is arranged in the housing and in the antechamber formed by it, the balloon opening of said enveloping element being connected to the fuel inlet channel of the housing.

Consequently, in this second variant according to the invention, the fuel first flows via the fuel inlet channel or the balloon opening into the inside of the enveloping element, from there from the inside to the outside into the antechamber and then from the antechamber via the fuel inlet opening into the measuring pipe. Due to the internal pressure in the enveloping element, this element can usually dispense with support structures, spacers and the like. With the inventive fuel level gauge according to the second aspect, the same advantages can be achieved that were already explained in conjunction with the first fuel level gauge.

In addition, the present invention provides a tank system that includes a fuel tank with predefined dimensions and a fuel level gauge as described above arranged in the fuel tank (or in a part of it).

The tank system according to the invention entails essentially the same advantages that were already explained above in conjunction with the inventive fuel level gauge.

The present invention also provides an aircraft, especially a rotary-wing aircraft, in particular a helicopter, having a tank system as described above. In this manner, an aircraft can be provided that has the advantages explained above in conjunction with the preceding description and that can be pressure refueled quickly, reliably and safely.

BRIEF DESCRIPTION OF THE DRAWINGS

Preferred embodiments of the invention with additional configuration details and further advantages are described in greater depth below and explained with reference to the accompanying drawings, in which.

DETAILED DESCRIPTION

Figure 1:
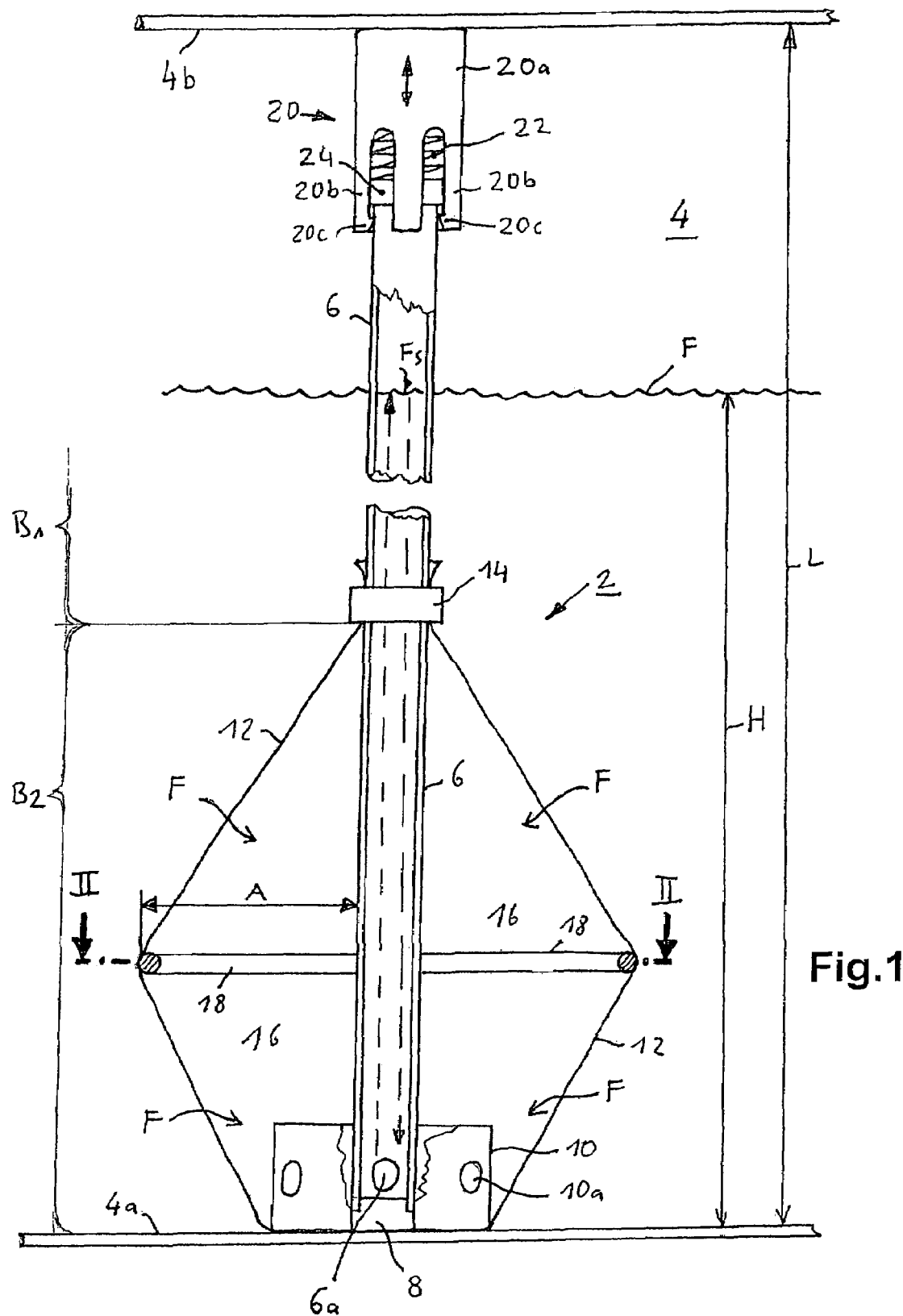
FIG. 1 a schematic, partially cutaway side view of a fuel level gauge according to the invention in a first embodiment.

In the following description and in the figures, in order to avoid repetitions, the same components and structures are designated with the same reference numerals insofar as no further differentiation is necessary or practical.

FIG. 1 shows a schematic, partially cutaway side view through a fuel level gauge 2 according to the invention mounted in a fuel tank 4 in a first embodiment. For the sake of clarity, only the bottom of the tank 4a and the top of the tank 4b of the fuel tank 4 are indicated The fuel level gauge 2 comprises a measuring pipe 6 configured as a riser pipe that has a fuel inlet opening 6a at one end area through which the fuel F can reach the inside of the measuring pipe 6. The measuring pipe 6 defines a measuring distance. A fuel level sensor 8 for measuring a fuel filling height H in the measuring pipe 6 is arranged at the lower end of the measuring pipe 6. This sensor 8 is preferably arranged in the vicinity of the fuel inlet opening 6a and has a measurement-sensitive sensor area. The sensor 8 in this example is an ultrasound fuel level sensor that, as the refueling operation progresses, measures the particular filling height H of the fuel F inside the measuring pipe 6 by measuring the propagation time of an ultrasound signal emitted by the sensor 8 and reflected back from the fuel surface $F_S$ of the fuel level as is indicated in FIG. 1 by an arrow drawn with a broken line. The measured filling height H represents the fuel level in the tank 4.

As shown in FIG. 1, the fuel inlet opening 6a is surrounded by a housing-like fuel labyrinth 10 that has at least one labyrinth inlet opening 10a that communicates with the fuel inlet opening 6a. The lower end of the measuring pipe 6, the sensor 8, the labyrinth 10 as well as any additional elements arranged on the lower end of the measuring pipe 6 such as, for example, an interface element or the like, are all surrounded by a fuel-permeable, thin-walled enveloping element 12. The enveloping element 12 in this embodiment is configured like a sock or bag, i.e. when it is still in its initial state before being mounted, one end is closed and its other end has a kind of closable sock or bag opening. The enveloping element 12 is pulled over the lower end of the measuring pipe 6.

On a first area B1 of the measuring pipe 6, i.e. on an outer circumferential area that is at a distance from the lower end of the pipe, the enveloping element 12 surrounds the measuring pipe 6 tightly so as to seal it. For this purpose, the sock opening is closed by means of a fastening element 14 (here: a pipe clamp or the like) and securely affixed to the measuring pipe 6. On a second area B2, i.e. a second outer circumferential area of the measuring pipe 6, which lies below the first area B1, the enveloping element 12 surrounds the fuel inlet opening 6a with its fuel labyrinth 10 and the labyrinth inlet opening 10a as well as the entire sensor 8 with its measurement-sensitive area over a large surface. Depending on the design of the sensor 8 and its arrangement on or in the measuring pipe 6, of course, configurations according to the invention are also conceivable in which the enveloping element 12 only surrounds a partial area of the fuel level sensor 8. In this example, the surface of the enveloping element 12 is approximately 1000 to 2000 times larger than the free surface area of the fuel inlet opening 6a.

In said second area B2, between the inside of the enveloping element 12 and the outside of the measuring pipe 6, a predefined radial distance A is established that varies over the area B2 and decreases to zero towards the first area B1. As a result, a large-volume antechamber 16 is formed upstream from the fuel inlet opening 6a and its fuel labyrinth 10. In this example, the volume of the antechamber 16 is approximately 50 to 300 times larger than the inner volume of the measuring pipe 6.

In the present case, the fuel-permeable, thin-walled enveloping element 12 is made of a textile polyamide fabric that, starting with a flat cut piece, was simply folded into a sock-like structure when it was affixed to the measuring pipe 6. Fundamentally, however, textile or textile-like enveloping elements can also be prefabricated by means of a textile production method (including sewing) to form a three-dimensional part. The polyamide fabric has the following properties:

| Polyamide fabric of the enveloping element | | |
|---|---|---|
| Yarn type: | | Polyamide 6.6 |
| Warp | dtex/fil: | 44/43 |
| | twist/m: | 0 |
| | threads/cm: | 67 ± 1 |
| Weft | dtex/fil: | 78/34 |
| | threads/cm: | 42 ± 1 |
| Weight in g/m$^2$ | | 67 ± 2 |
| Fabric thickness in microns | | 130 ± 5 |

-continued

| Polyamide fabric of the enveloping element | |
|---|---|
| pH value | 5/7.5 |
| Capillary rise of water in mm | 55 ± 5 |
| Breaking strength in daN/cm | 13.5 |

The invention, however, is not restricted either to this type of enveloping element 12 or to this specific material. Fundamentally, other suitable fabrics or materials can also be used, whereby the basic prerequisite for suitability is, of course, that they must be fuel resistant or fuel-proof. Thus, the enveloping element 12 can especially be an element that, aside from the above-mentioned polyamide fabric, is selected from a group of materials encompassing fuel filter paper; a foam, especially one made of plastic or metal; a honeycomb structure; a (different) textile woven or knit fabric; a metal woven or knit fabric; a non-woven or felt-like fiber arrangement; a micro-porous film, plate or solid sleeve; a micro-perforated film, plate or solid sleeve; a grid arrangement; a mesh arrangement; mixed forms of the above-mentioned materials. The enveloping element 12 can be soft or draped like a textile or, for example, can be folded or shaped like an element in the form of a film or plate, or else it can be configured to be relatively stiff so that it can be shaped or prefabricated simply with auxiliary means or tools. A grid arrangement can also be shaped by injection-molding a suitable element. Aside from textile production methods, the meshes, grids or pores of the enveloping element can also be created by drilling, perforation, micro-perforation, punching, stamping, puncturing, etching, sintering, laser techniques and the like.

Figure 2:
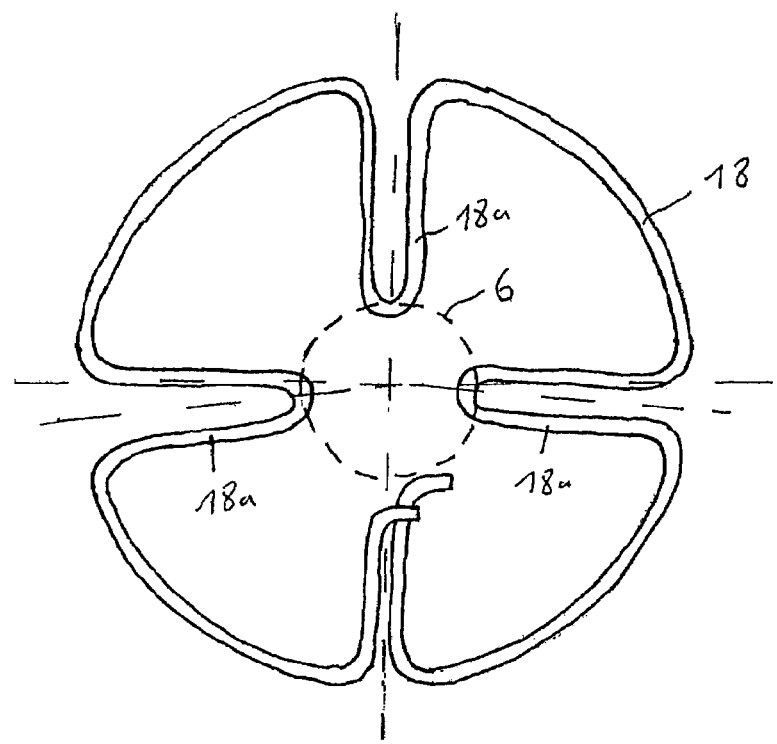
FIG. 2 a schematic cross sectional view along line II-II in FIG. 1.

In order to ensure the predefined distance A between the enveloping element 12 and the measuring pipe outer circumference, a spacer 18 is arranged on the measuring pipe 6 in the second area B2. The enveloping element 12 extends around or is stretched over this spacer 18. As can be seen in FIG. 2, which shows a schematic cross sectional view along line II-II in FIG. 1, this spacer 18 is a simple, bent wire ring. This wire ring 18 extends around the measuring pipe 6 and has loop-like sections 18a that face the inside of the ring and that are affixed in indentations or bulges (not shown) that are provided on the outer circumference of the measuring pipe 6 (or on an intermediate element installed there). A similar spacer could also be manufactured, for example, as an injection-molded part made of plastic. Suitable spacers can also be configured to be housing-like or cage-like and can have a plurality of passage openings.

The wire ring that serves as the spacer 18, together with the basic arrangement of the enveloping element 12 described above, results in a geometry of the antechamber 16 that, in this example, consists of two truncated geometric shapes stacked on top of each other. Depending on the shaping of the enveloping element 12 as well as on the form of the spacer A, the geometric shape of the antechamber 16 can, of course, be configured differently, for example, it can be spherical, box-shaped, polyhedral, etc. According to the invention, it is also provided in at least one other embodiment to stretch the enveloping element 12 like a tent over a rib-like or skeleton-like support structure surrounding the measuring pipe 6. In this case, the support structure does not necessarily have to be attached to the measuring pipe or else in or on the second area B2. Rather, it can also be designed so as to be self-supporting, for example, as an integral part of the enveloping element 12. In this case, the support structure differs from the above-mentioned spacer 18. A combination of a spacer and a support structure is likewise conceivable.

As can also be seen in FIG. 1, a measuring pipe length compensation device 20 is arranged at the end of the measuring pipe 6 facing away from the fuel inlet opening 6a. In this manner, the length L of the fuel level gauge 2, which is essentially determined by the dimension of the measuring pipe 6, can easily be adapted to fuel tanks of different heights. In the present case, the length compensation device 20 comprises an end cap 20a that is placed onto the upper end and that can be moved in the longitudinal direction of the measuring pipe 6 against the pre-tensioning force of a spring device 22—arranged on the end of the measuring pipe—towards the sensor 8, and then away from said sensor 8 by virtue of the spring force, as is indicated in the drawing by a double-headed arrow. In this manner, the fuel level gauge 2 can not only be adjusted in terms of the length but, at the same time, can also be attached in the tank 4 simply in that it is clamped by means of the spring device 22 between the bottom 4a and the top 4b of the tank 4. In order to prevent the device 2 from slipping sideways, the bottom 4a and/or the top 4b can be provided with recesses or holders that laterally guide the device 2. The lower edge of the end cap 20a has a plurality of elastic tongues 20b that are spaced apart from each other by slits and that have hook-shaped ends 20c which, like a snap connection, engage via a latching ring 24 attached at the upper end of the measuring pipe and latch behind said ring. Consequently, the end cap 20a is firmly secured to the measuring pipe 6.

Other add-on devices can be installed on the measuring pipe 6 such as, for example, a so-called low-level warning sensor, which emits a warning signal at a predefined low fuel level in the tank 4, or a water detector, which detects any water that might be present in the fuel F and emits an appropriate warning signal. If there is a need for supply lines or cable feed lines to components or interfaces located inside the enveloping element 12, these lines should advantageously be arranged and sealed in such a way that no excessive fuel flow can penetrate between these lines and the enveloping element 12. However, no special requirements have to be made in terms of the requisite tightness since, after all, the enveloping element 12 is fuel-permeable. In other words, the sealing only has to ensure that most of the fuel F that is to be fed to the measuring pipe 6 continues to pass through the enveloping element 12.

Figure 3:
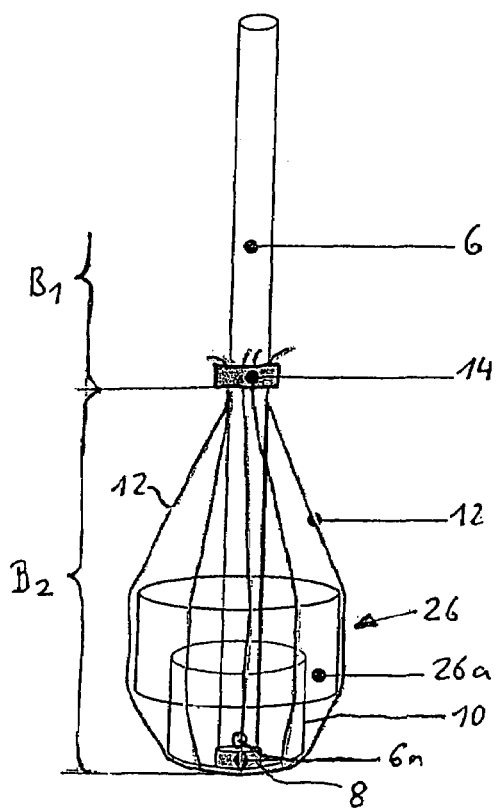
FIG. 3 a schematic three-dimensional depiction in a phantom view of a fuel level gauge according to the invention in a second embodiment.

FIG. 3 shows a schematic three-dimensional, grid-like representation of a fuel level gauge 2 according to the invention in a second embodiment. This variant largely matches the one in FIGS. 1 and 2. Instead of the spacer 18 in the form of a bent wire ring, however, a different construction is used. As indicated in FIG. 3, a fuel density sensor 26 is provided in the second area B2 of the measuring pipe 6 and this fuel density sensor 26 has a virtually cylindrical sensor housing 26a that extends concentrically around the measuring pipe 6 and part of the labyrinth 10. In this example, the diameter of the sensor housing 26a is about 3 to 5 times the outer diameter of the measuring pipe 6. The sensor housing 26a serves as a spacer for the enveloping element 12 and thus fulfills an advantageous dual function. In FIG. 3, the enveloping element 12 is only indicated by a few lines in order to indicate the envelope shape of the enveloping element 12. The fuel density sensor 26 is a capacitive sensor that measures the fuel density preferably only once a predefined minimum fuel level in the tank 4 has been reached.

Figure 4:
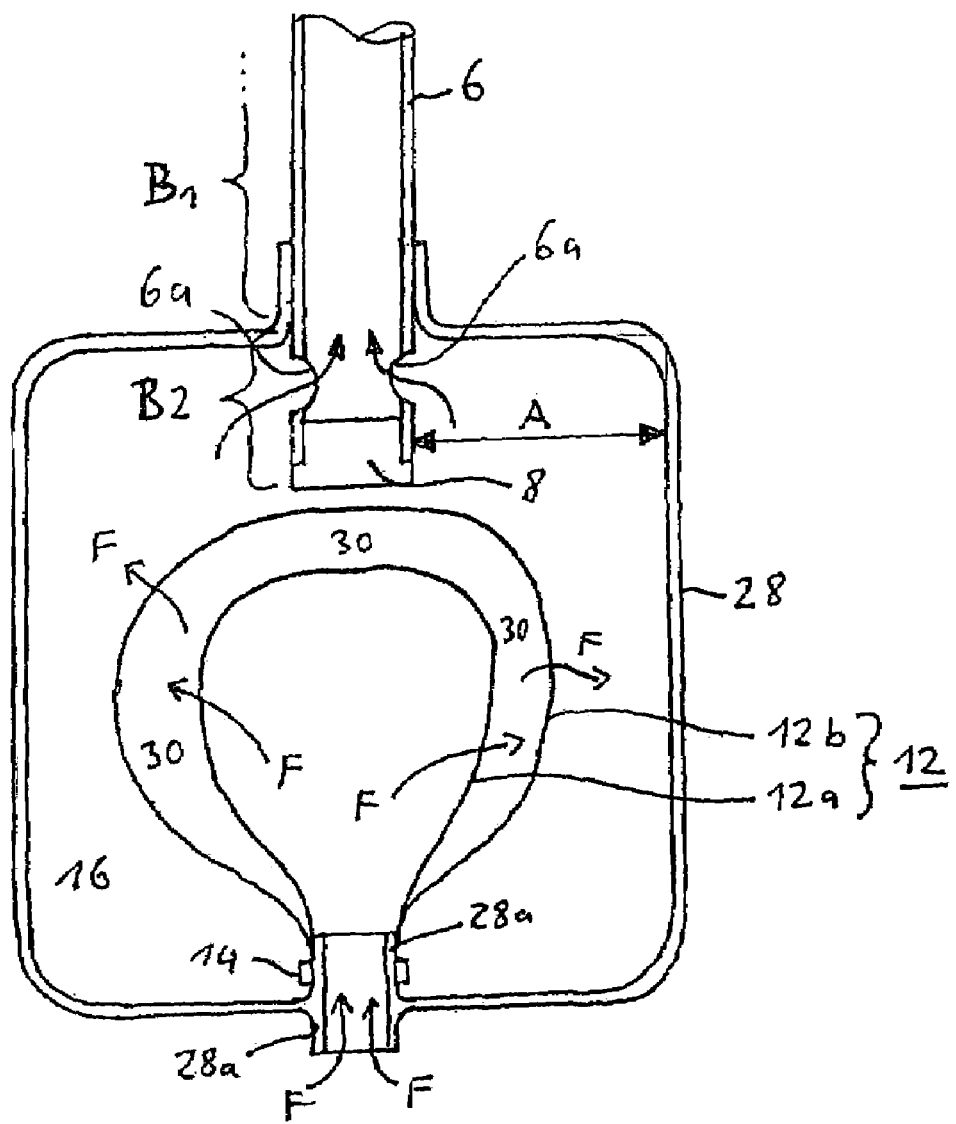
FIG. 4 a schematic longitudinal sectional view through a fuel level gauge according to the invention in a third embodiment.

FIG. 4 shows a schematic longitudinal sectional view through a fuel level gauge 2 according to the invention in a third embodiment This variant uses various components that are already known from the embodiments of FIGS. 1 to 3, which is indicated by the use of the same reference numerals. However, the embodiment according to FIG. 4 differs from that of FIGS. 1 to 3 especially in terms of the arrangement and functionality of the fuel-permeable, thin-walled enveloping element 12.

As can be seen in FIG. 4, a housing 28 is installed on the measuring pipe 6, whereby said housing 28 surrounds the first area B1 of the measuring pipe 6 so as to seal it and encloses the second area B2 at a predefined distance A over a large surface, said second area B2 comprising at least the fuel inlet opening 6a and the measurement-sensitive area of the fuel level sensor 8. In this second area B2, the housing 28 forms a large-volume antechamber 16 between the inside of said housing 28 and the outside of the measuring pipe 6, said antechamber 16 being upstream from the fuel inlet opening 6a or from a fuel labyrinth that might be provided. The housing 28 is provided with a fuel inlet channel 28a that is configured as a pipe socket.

The fuel level gauge 2 also comprises a balloon-like, large-surface, fuel-permeable, thin-walled enveloping element 12 that is provided with a balloon opening and that has two individual balloons 12a, 12b of different sizes that are arranged one inside the other. An intermediate chamber 30 is formed between the inner, smaller individual balloon 12a and the outer, larger individual balloon 12b. The balloon-like enveloping element 12 is arranged in the housing 28 and in the antechamber 16 formed by said housing. With its balloon opening, the enveloping element 12 is connected to the fuel inlet channel 28a of the housing 28 so as to be sealed. In this embodiment, the fuel F first flows into the inner chamber of the first, inner individual balloon 12a, from there into the intermediate chamber 30 and from there through the second, outer individual balloon 12b to the outside into the antechamber 16. From there, the fuel F goes into the measuring pipe 6. In contrast, in the variant according to FIGS. 1 to 3, the fuel F flows from the outside of the enveloping element 12 through the latter into its internal space, that is to say, into the antechamber 16.

Figure 5:
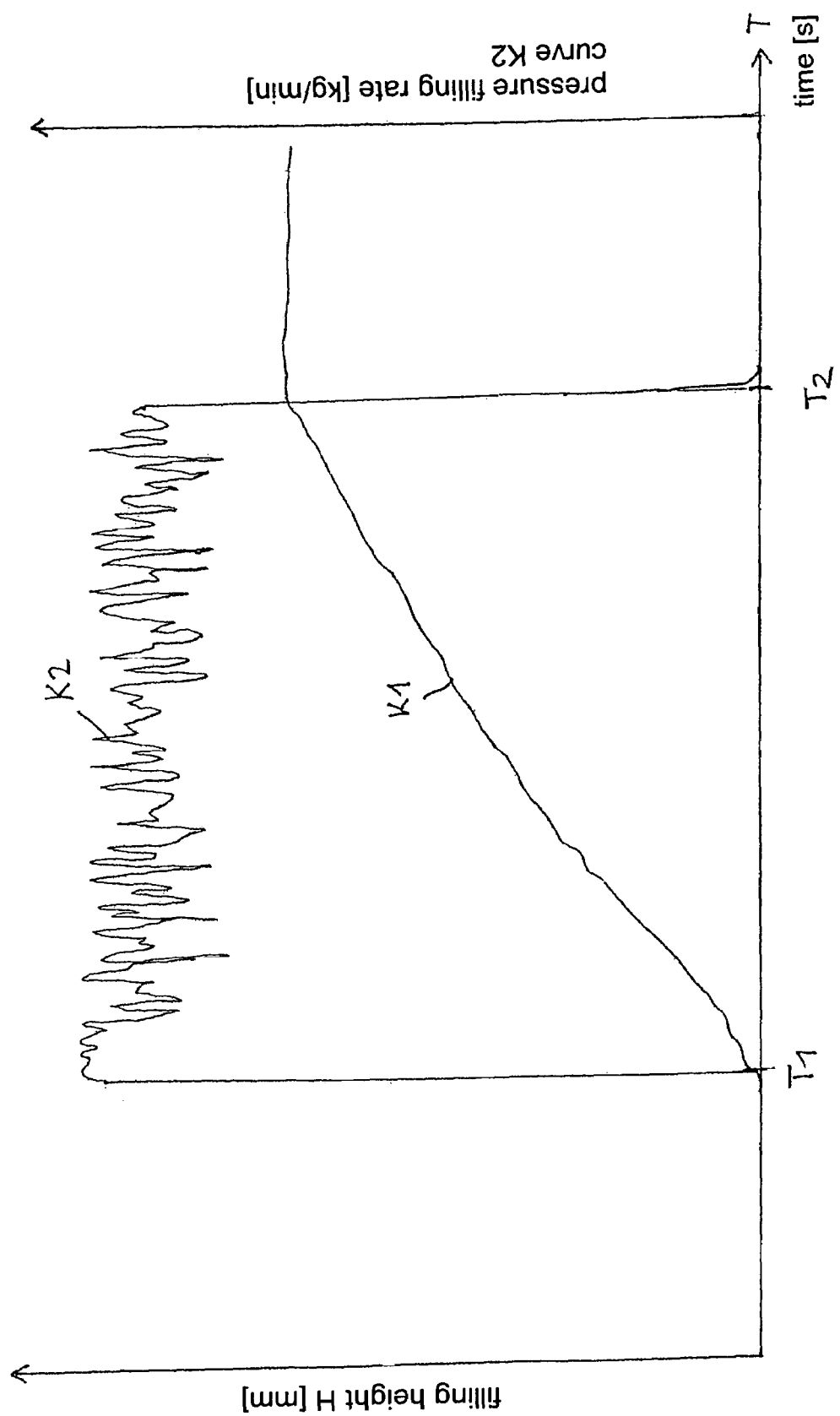
FIG. 5 a schematic diagram with one measured curve obtained with a fuel level gauge according to the invention.
Figure 6:
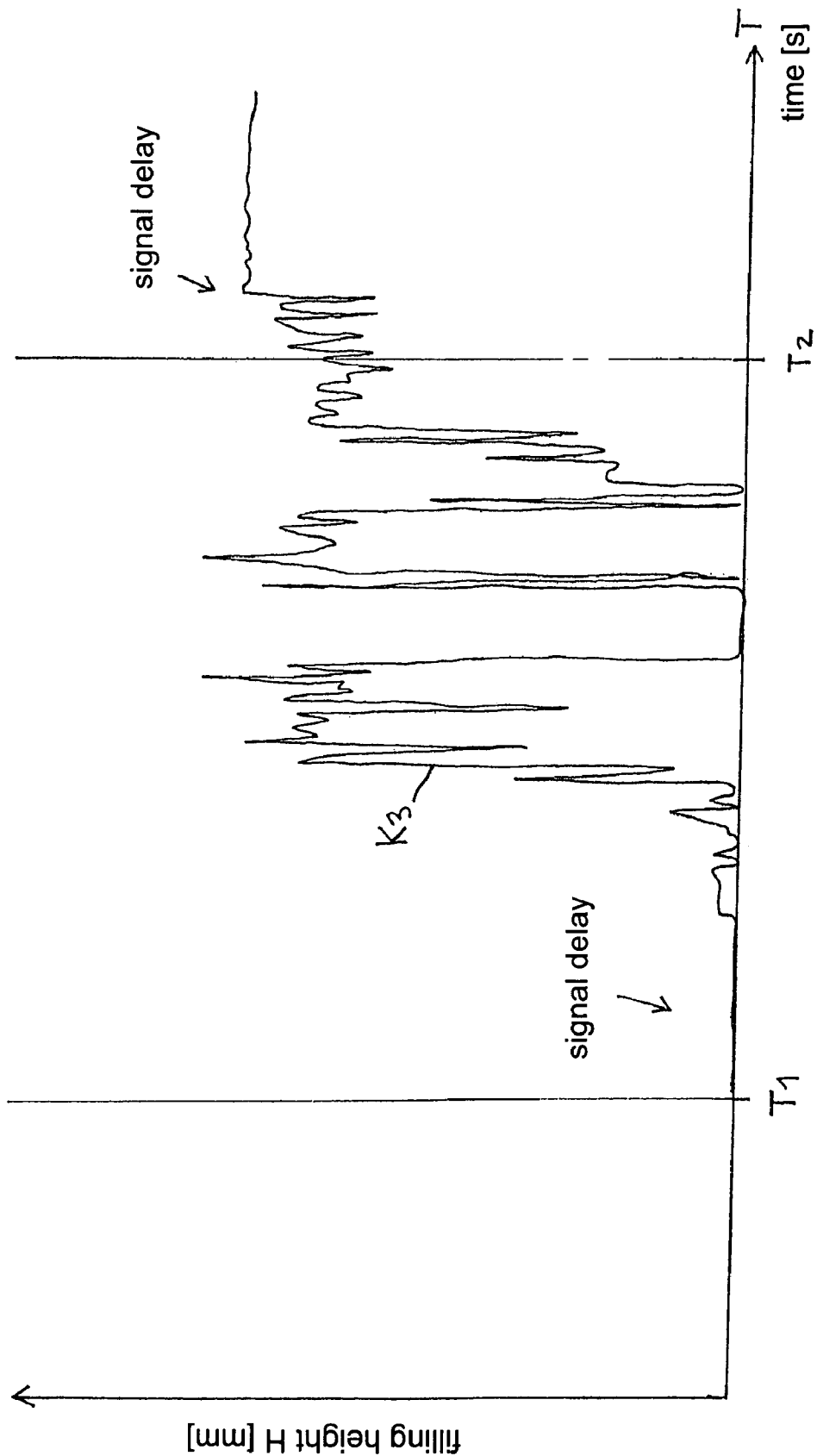
FIG. 6 a schematic diagram with two measured curves obtained with a conventional fuel level gauge.

FIG. 5 shows a schematic diagram with a measured curve K1 obtained by means of a fuel level gauge according to the invention, and a second measured curve K2 obtained independently with an external flow meter as well as a pressure refueling rate expressed in kg/min. FIG. 6 shows a schematic diagram with a measured curve K3 obtained by means of a conventional fuel level gauge. In both diagrams, the filling height H or the current fuel level in the fuel tank ascertained by the fuel level sensor is plotted over the pressure refueling time T in the curves K1 and K3. T1 designates the beginning and T2 the end of the pressure refueling. As can be seen in FIG. 6, the conventionally obtained measured curve K3 of the state of the art exhibits an irregular, unsteady curve shape with numerous signal peaks resulting from unreliable measured signals. Moreover, a marked signal delay can be seen at the beginning and after the end of the pressure refueling. This measured curve K3 is useless and does not allow any meaningful determination of the pressure refueling rate (e.g. in kg/min) during the pressure refueling.

The measured curve K1 of FIG. 5 obtained with the fuel level gauge according to the invention behaves quite differently. As can be seen in this diagram, due to reliable measured signals that have flawless signal characteristics, a regular, steady measured curve K1 that rises virtually linearly can be achieved over the entire duration of the pressure refueling operation. Signal delays at the beginning and after the end of the pressure refueling operation do not occur.

Figure 7:
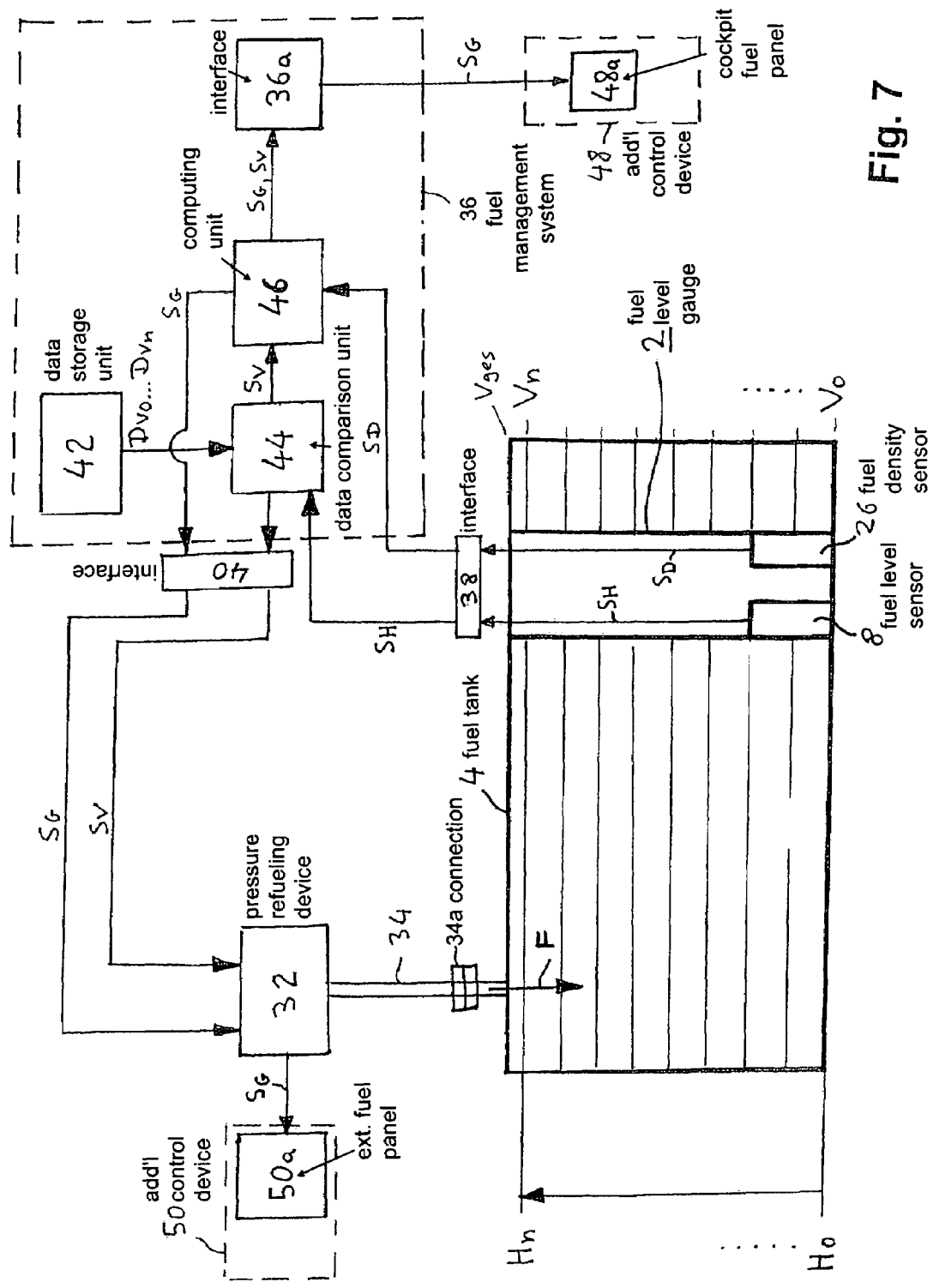
FIG. 7 a schematic block diagram of a tank system according to the invention that is equipped with a fuel level gauge according to the invention.

FIG. 7 shows a schematic block diagram of an inventive tank system of an aircraft, i.e. here a helicopter. The tank system comprises a helicopter fuel tank 4 having a predefined shape and predefined dimensions. The fuel tank 4 can have one or more individual compartments, each of which can be equipped with its own fuel level gauge if so desired. In describing the invention, for the sake of simplicity, only one single tank 4 with one single compartment will be shown here. Moreover, the tank system comprises a fuel level gauge 2 arranged in the fuel tank 4 or in part of it, as was described in detail above. In the present embodiment, the fuel level gauge 2—aside from the requisite fuel level sensor 8—is additionally equipped with a fuel density sensor 26.

The tank system also comprises a controllable or regulatable pressure refueling device 32 that is supplied from a fuel reservoir and that feeds fuel F into the fuel tank 4 via a fuel line 34 that can be connected to the fuel tank 4 by means of a connection 34a. The pressure refueling device 32 is not an installed component of the helicopter itself but rather it is provided externally, for example, in a tanker aircraft or on a seagoing vessel. Moreover, the tank system is equipped with a fuel management system 36 (also referred to as a fuel management controller) that is preferably installed in the helicopter itself and that can be coupled to the pressure refueling device 32 and to the fuel level gauge 2 via a first and a second interface 38, 40.

The fuel management system 36 comprises, among other things, a data processing unit with a data storage unit 42. The data processing unit also has a data comparison unit 44 and a computing unit 46 that is coupled to the data comparison unit 44. The fuel management system 36 communicates via a third interface 36a (here a so-called ARINC interface) with a first additional control device 48 located in the cockpit of the helicopter. This control device 48 comprises, for instance, a so-called cockpit fuel panel 48a with a fuel weight display. Moreover, the fuel management system 36 can be coupled via the interface 40 to a second, external additional control device 50 that is associated with the external pressure refueling device 32 and that has a so-called external fuel panel 50a.

A data collection is stored in the data storage unit 42 containing a large amount of unambiguous partial volume data $D_{V0}$ to $D_{Vn}$ that is associated with a given partial filling height $H_0$ to $H_n$ of the fuel tank 4 and that, in each case, represents a partial volume $V_0$ to $V_n$ of a maximum total volume $V_{tot}$ of the fuel tank 4 corresponding to the given filling height $H_0$ to $H_n$. The appertaining unambiguous partial volume data $D_{V0}$ to $D_{Vn}$ can either be defined as a fixed value or else as a value range.

The same applies to the partial filling heights or to the partial volumes. In order to compile the data collection, for example, in the form of a data table or the like, this association can be made empirically as well as purely computationally. In this manner, the data pertaining to the tank volume and to the volume distribution of the tank 4 can be precisely ascertained and displayed.

The tank system according to the invention functions as follows.

By means of the pressure refueling device 32, fuel F is filled under pressure into the tank 4 via the fuel line 34. The sensor 8 of the fuel level gauge 2 detects the fuel level in the tank 4 and emits a level signal $S_H$ that represents a specific current filling height $H_0$ to $H_n$ in the fuel tank 4. The level signal $S_H$ is entered into the fuel management system 36. On the basis of the level signal $S_H$, as the refueling operation progresses, the fuel management system 36 determines the current fuel volume, that is to say, the steadily increasing partial volume $V_0$ to $V_n$, in the fuel tank 4.

This is done in that the data comparison unit 44 continuously compares the entered level signal $S_H$ to the stored partial volume data $D_{V0}$ to $D_{Vn}$ that is associated with a given filling height $H_0$ to $H_n$ and determines whether the level signal $S_H$ corresponds to one of the unambiguous partial volume data $D_{V0}$ to $D_{Vn}$. Depending on the type of previously stored partial volume data $D_{V0}$ to $D_{Vn}$, a correspondence of the level signal $S_H$ to one of the unambiguous partial volume data $D_{V0}$ to $D_{Vn}$ can be defined in different ways. If the partial data volume data $D_{V0}$ to $D_{Vn}$ has been defined as a fixed value, then a correspondence exists if the value represented by the level signal $S_H$ is the same as this fixed value. However, if the partial volume data $D_{V0}$ to $D_{Vn}$ has been defined, for example, as a predefined value range, then a correspondence exists if the value represented by the level signal $S_H$ lies within said value range. In both cases, tolerances or tolerance ranges can be defined.

If it is ascertained that the level signal $S_H$ corresponds to one of the unambiguous partial volume data $D_{V0}$ to $D_{Vn}$, then the data comparison unit 44 emits a volume signal $S_V$ that represents an ascertained current fuel volume in the fuel tank 4. This volume signal $S_V$ of the fuel management system 36 is then forwarded to the pressure refueling device 32 as a control signal.

The pressure refueling device 32 then uses this volume signal $S_V$ to control, that is to say, for example, to actuate or regulate, the feed of the fuel F to the tank 4. Once the fuel level in the tank 4 has reached a predefined or preselected filling height (e.g. $H_n$), then—on the basis of an appropriate control signal $S_V$—the pressure refueling device 32 interrupts the feed of fuel F to the tank 4 or shuts down this feed.

The fuel density sensor 26 measures the density of the fuel F that is present in the tank 4 and emits a density signal SD that represents the density to the fuel management system 36 and to its computing unit 46. Moreover, the computing unit 46 receives the volume signal $S_V$ from the data comparison unit 44. The computing unit 46 then multiplies the value of the volume signal $S_V$, which represents the current fuel volume in the fuel tank 4, by the value of the density signal $S_D$. The result of this operation is a fuel weight signal $S_G$ that represents the current fuel weight in the fuel tank 4. Advantageously, the fuel density is only measured once a predefined level in the tank 4 has been reached since, as a rule, only then is a reliable density measurement possible. Prior to that (or if a density measured value is not available), the fuel management system 36 works with a predefined default value for the fuel density.

The fuel weight signal $S_G$, and optionally also the volume signal $S_V$, are emitted directly or indirectly to the first and second additional control device 48, 50 and displayed in the cockpit fuel panel 48a as well as in the external fuel panel 50a.

The fuel management system 36 and its components operate during the refueling operation either continuously, that is to say, in uninterrupted work steps or else in a series of consecutive individual steps, or else with short, precisely defined interruptions, for example, in the form of timed work steps.

The invention is not limited to the above-mentioned embodiments. Within the protective scope of the claims, the device according to the invention and the tank system according to the invention can also assume different embodiments than those described concretely above. Thus, in particular, it is conceivable that additional intermediate elements or adapters can be provided between the enveloping element 12 and the measuring pipe 6 or between the enveloping element 12 and a housing 28 that accommodates the enveloping element 12, and these intermediate elements or adapters can also have interface elements, cable bushings, plug-in elements and the like. Depending on the configuration of the fuel level gauge 2 and of the measuring pipe 6, the measuring pipe length compensation device 20 can also be arranged on the side of the measuring pipe 6 having the enveloping element 12 or on both sides thereof. The measuring pipe length compensation device 20 can also have other suitable adjustment mechanisms such as, for example, a screw device, a lever device, etc.

The fuel density sensor can also be configured as a flat capacitor-like element that is arranged on the bottom of the tank.

The signals and data generated and processed within the scope of the use of the fuel level gauge according to the invention as well as the tank system according to the invention can be fed via separate or shared signal lines or data lines, depending on the particular architecture of the device or system in question. The fuel management system can have interfaces to other add-on devices, especially to an on-board computer of an aircraft. The pressure refueling device can have other add-on devices such as, for example, fuel reservoirs, valves, additional control devices, operating elements, etc. All of the systems of the fuel level gauge according to the invention as well as of the tank system according to the invention can be configured redundantly. In particular, the cockpit fuel panel 48a can assume redundant functions for the fuel management system 36.

Reference numerals in the description and drawings serve only for purposes of better elucidating the invention and should not be construed as restricting the scope of protection.

What is claimed is:

1. A fuel level gauge comprising:
a measuring pipe including a first area and a second area and having a fuel inlet opening at one end, the measuring pipe being configured as a riser pipe and defining a measuring distance;
a fuel level sensor associated with the measuring pipe and disposed in a vicinity of the fuel inlet opening, the fuel level sensor including a measurement-sensitive sensor area and configured to measure the fuel filling height in the measuring pipe; and
a fuel-permeable, thin-walled enveloping element, the enveloping element surrounding the measuring pipe tightly at the first area so as to form a seal with the measuring pipe, and enclosing the second area of the measuring pipe at a predefined distance over a surface, the second area encompassing at least the fuel inlet opening and the measurement-sensitive area, the enveloping area forming a large-volume antechamber upstream from the fuel inlet opening and between an inside of the enveloping element and an outside of the measuring pipe.

2. A fuel level gauge comprising:
a measuring pipe including a first area and a second area and having a fuel inlet opening at one end, the measuring pipe being configured as a riser pipe and defining a measuring distance;
a fuel level sensor associated with the measuring pipe and disposed in a vicinity of the fuel inlet opening, the fuel level sensor including a measurement-sensitive sensor area and configured to measure the fuel filling height in the measuring pipe;
a housing including a fuel inlet channel and surrounding the first area of the measuring pipe so as to form a seal with the measuring pipe and enclosing the second area of the measuring pipe at a predefined distance over a surface, the second area encompassing at least the fuel inlet opening and the measurement-sensitive area, the housing forming a large volume antechamber upstream from the fuel inlet opening in the second area between an inside of the housing and the measuring pipe; and
a balloon-like, fuel-permeable, thin-walled enveloping element having a balloon openingand being disposed in the housing and in the antechamber, the balloon opening being connected to the fuel inlet channel.

3. The fuel level gauge as recited in claim 1, wherein the enveloping element includes at least one material selected from a group consisting of: a fuel filter paper; a foam; a honeycomb structure; a textile woven or knit fabric; a metal woven or knit fabric; a non-woven or felt-like fiber arrangement; a micro-porous film, plate or solid sleeve; a micro-perforated film, plate or solid sleeve; a grid arrangement; and a mesh arrangement.

4. The fuel level gauge as recited in claim 1, further comprising a housing-like fuel labyrinth surrounding the fuel inlet opening and having at least one labyrinth inlet opening communicating with the fuel inlet opening, and wherein the fuel-permeable enveloping element surrounds the at least one labyrinth opening at a predefined distance.

5. The fuel level gauge as recited in claim 1, wherein the enveloping element at least partially encloses the fuel level sensor.

6. The fuel level gauge as recited in claim 1, wherein the enveloping element is sock-shaped having a closable sock opening and is capable of being pulled over the measuring pipe from one end and affixed to the measuring pipe in a region of the closable sock opening.

7. The fuel level gauge as recited in claim 1, further comprising a support structure surrounding the measuring pipe and wherein the wherein the enveloping element is stretched in a tent-like manner over the support structure.

8. The fuel level gauge as recited in claim 7, wherein the support structure is one of rib-like and skeleton-like.

9. The fuel level gauge as recited in claim 7, wherein the support structure includes a spacer disposed on the measuring pipe in the second area, and wherein the enveloping element extends around the spacer.

10. The fuel level gauge as recited in claim 9, wherein the spacer is a bent wire ring extending around the measuring pipe and having sections that face an inside of the ring and are affixable in holders provided on the measuring pipe.

11. The fuel level gauge as recited in claim 1, further comprising a fuel density sensor in the second area and having a sensor housing disposed around the measuring pipe and configured as a spacer.

12. The fuel level gauge as recited in claim 1, further comprising a measuring pipe length compensation device disposed on the measuring pipe.

13. The fuel level gauge as recited in claim 1, wherein the fuel level sensor is an ultrasound fuel level sensor.

14. A tank system comprising:
a fuel tank having predefined dimensions; and
a fuel level gauge that include:
  a measuring pipe disposed in the fuel tank and including a first area and a second area and having a fuel inlet opening at an end in the second area, the measuring pipe being configured as a riser pipe and defining a measuring distance;
  a fuel level sensor associated with the measuring pipe and disposed in a vicinity of the fuel inlet opening, the fuel level sensor including a measurement-sensitive sensor area disposed in the second area and configured to measure the fuel filling height in the measuring pipe; and
  a fuel-permeable, thin-walled enveloping element, the enveloping element surrounding the measuring pipe tightly in the first area so as to form a seal with the measuring pipe, and enclosing the second area of the measuring pipe at a predefined distance over a large surface, the enveloping area forming a large-volume antechamber upstream from the fuel inlet opening and between an inside of the enveloping element and an outside of the measuring pipe.

15. The tank system as recited in claim 14, further comprising:
  controllable pressure refueling device connectable to the fuel tank and configured to feeding a fuel into the fuel tank under pressure;
  a fuel management system connectable to the pressure refueling device and to the fuel level gauge, the fuel management system including a data processing unit with a data storage unit,
  wherein the fuel level gauge is configured to emit a level signal representing a current filling height in the fuel tank, and to continuously determine a current fuel volume in the fuel tank using the level signal,
  wherein the fuel management system is configured to emit a control signal to the pressure refueling device based on the current fuel volume, and
  wherein the pressure refueling device is configured to control the feeding of the fuel into the tank based on the control signal.

16. The tank system as recited in claim 15, wherein the data storage unit is configured to store a data collection containing plurality of partial volume values each associated with a given filling height of the fuel tank, and each representing a partial volume of a maximum total volume of the fuel tank corresponding to the respective given filling height, and
  wherein the data processing unit has a data comparison unit configured to continuously compare the level signal to an associated, stored partial volume value and to emit a volume signal representing a current fuel volume in the fuel tank to the pressure refueling device if a correspondence exists with one of the unambiguous partial volume values.

17. The tank system as recited in claim 16, further comprising a fuel density sensor and at least one additional control device, the fuel density sensor communicating with the fuel tank and emitting a density signal representing a density of the fuel to the fuel management system and to the at least one additional control device coupled to the fuel management system, and
  wherein the data processing unit has a computing unit coupled to the data comparison unit configured to multiply a value of the volume signal by a value of the density signal and to emit a fuel weight signal representing a current fuel weight in the fuel tank to the at least one additional control device.

18. The fuel level gauge as recited in claim 2, wherein the enveloping element includes at least one material selected from a group consisting of; a fuel filter paper; a foam; a honeycomb structure; a textile woven or knit fabric; a metal woven or knit fabric; a non-woven or felt-like fiber arrangement; a micro-porous film, plate or solid sleeve; a micro-perforated film, plate or solid sleeve; a grid arrangement; and a mesh arrangement.

19. The fuel level gauge as recited in claim 2, further comprising a housing-like fuel labyrinth surrounding the fuel inlet opening and having at least one labyrinth inlet opening communicating with the fuel inlet opening, and wherein the fuel-permeable enveloping element surrounds the at least one labyrinth opening at a predefined distance.

20. An aircraft having a tank system as recited in claim 14.

* * * * *